Aug. 20, 1968  J. L. SELTORP  3,398,051
HETEROGENEOUS ATOMIC REACTOR

Filed Sept. 9, 1966  4 Sheets-Sheet 2

INVENTOR
JONAS LEONARD SELTORP

BY *Wenderoth, Lind & Ponack*
ATTORNEYS

INVENTOR
JONAS LEONARD SELTORP

BY *Wenderoth, Lind & Ponack*
ATTORNEYS

Aug. 20, 1968     J. L. SELTORP     3,398,051
HETEROGENEOUS ATOMIC REACTOR

Filed Sept. 9, 1966     4 Sheets-Sheet 4

INVENTOR
JONAS LEONARD SELTORP

BY *Wenderoth, Lind, & Ponack*
ATTORNEYS

United States Patent Office 3,398,051
Patented Aug. 20, 1968

3,398,051
HETEROGENEOUS ATOMIC REACTOR
Jonas Leonard Seltorp, Skarmarbrinksvagen 1,
Stockholm-Enskede, Sweden
Continuation-in-part of application Ser. No. 369,047,
Feb. 3, 1964. This application Sept. 9, 1966, Ser.
No. 578,193
Claims priority, application Sweden, Feb. 6, 1963,
1,314/63
3 Claims. (Cl. 176—45)

ABSTRACT OF THE DISCLOSURE

The invention relates to a heterogeneous reactor with a substantially spherical reactor tank having parts wherein the neutron flux is strong and parts wherein the neutron flux is of less strength. The reactor fuel is easily replaceable and rearrangeable so as to reach a high and smooth burn. A molten coolant carries fuel elements in the shape of spherical bodies containing fuel in a partly molten state. Coolant channels communicate with spherical spacing within the bodies. The specific gravity of the fuel bodies is at least substantially equal to that of the coolant. Diametrically opposite sections of the reactor tank are provided with connections divided into at least two groups. One central group has inlets and outlets for said cooling medium positioned diametrically opposite to each other which central group has a flow-through direction of said cooling medium always the same, except when performing fuel exchange. A second group of connections is placed round said central group. Coolant flow-through direction may be reversed through the second group of connections. In running state the entire cross-section of the reactor is flowed through by the cooling medium in a parallel flow to ensure that the fuel elements are kept in a fixed position in the tank by a hydrodynamic pressure. In a fuel rearrangement state, when the flow-through direction through the second group of connections is reversed the cooling medium moves in a whirling motion in said tank to rearrange the fuel elements in a transport cycle from the central part of the tank, where the neutron flux is high to more peripherically situated parts, where the neutron flux is lower.

---

This application is a continuation-in-part of my application Ser. No. 369,047 filed Feb. 3, 1964, now abandoned, entitled Heterogeneous Atomic Reactor With Circulating Fuel.

In my copending application Ser. No. 452,439, filed Apr. 12, 1965, now Patent No. 3,350,272, for a Heterogeneous Atomic Reactor, which is a continuation of my application Ser. No. 145,530, filed Oct. 9, 1961, now abandoned, I have disclosed an atomic reactor of a so-called thermal type.

In the said application there is disclosed a heterogeneous reactor with at least substantially spherical reactor tank, having parts wherein the neutron flux is strong and parts wherein the neutron flux is of less strength, means by which a whirling motion of fuel elements within a coolant in a molten state is created within the tank from radially innermost portions thereof and vice versa to cause all fuel of all of the fuel elements to reach a smooth and high burn-up. The fuel elements are at least partly hollow bodies containing a fuel in at least a partly molten state, and the fuel elements have a spherical outer housing and an inner container also of spherical form. The inner container is supported within the outer container by means of separated spacing elements to thereby maintain spherical spacing between the inner container and the outer housing. Coolant medium channels extending radially through the outer housing communicate with said spherical spacing. The specific gravity of the fuel bodies is at least substantially equal to that of the coolant in which said elements are carried. The atomic reactor according to the said application is intended to work with a continuous whirling motion of the fuel elements within the tank from radially innermost to radially outermost portions thereof and vice versa.

However, according to the present invention, it has been found desirable, for certain applications, to be able to work with the fuel elements in a fixed position in operation and to cause them to move with a whirling motion for rearrangement purposes only.

Accordingly, one object of the present invention is to provide a heterogeneous atomic reactor of the so-called intermittent type.

Another object of the present invention is to provide an improved fuel element for use in a heterogeneous atomic reactor.

Further, according to the present invention, it has been ascertained that the intermittent atomic reactor type easily lends itself to being constructed as a so-called breeder reactor. Accordingly, still another object of the present invention is to provide an improved heterogeneous atomic reactor of the breeder type.

The invention will now be described in more detail with reference to the accompanying drawings.

Figure 1:
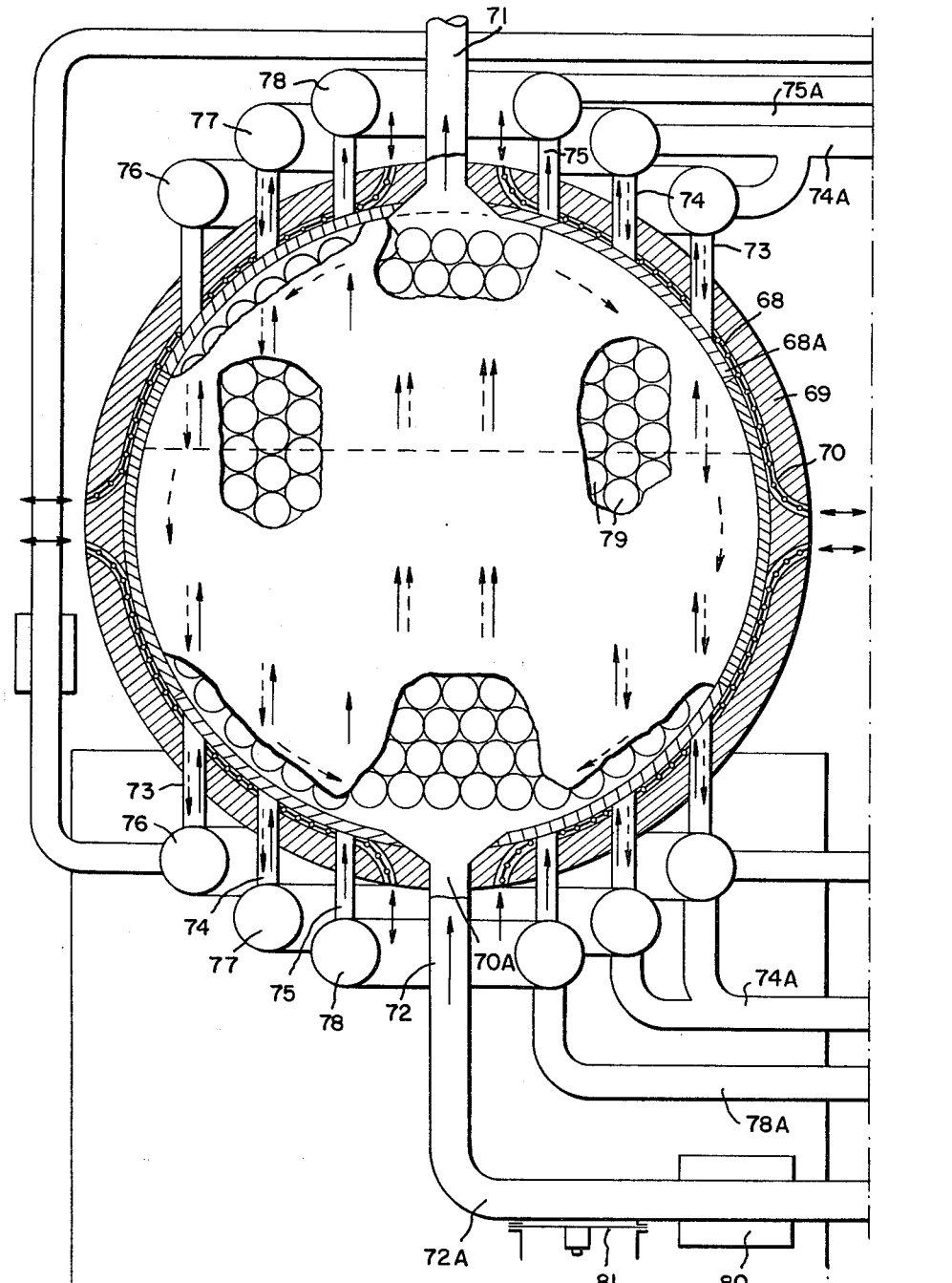
FIGURE 1 shows diagrammatically in a vertical cross-section a breeder reactor according to the invention.

The breeder reactor of FIGURE 1 consists of a reactor tank 68 of a spheric shape. The reactor tank consists of a high temperature resistant shell, which can be corrosion-proof against the cooling medium, but it could also be considered to use any other suitable steel material, provided that the inside of the tank is covered with a coating which is corrosion-proof against the cooling medium. Around the reactor tank 68 there is a neutron reflector 69, which is also used for heat insulation purposes. Further the insulation is also intended to serve as a stiffener to avoid deformation of the reactor tank due to the influence of the high temperatures. The reflector is suitably cooled through separate built-in tubes. Directly on the outside of the real reactor tank 68 there are control devices in the shape of strips or chains 70, comprising a moderator material.

The reactor has centrally placed inlets and outlets 71 and 72, above and below, for delivery and withdrawal of the cooling medium and also for the exchange of fuel elements as further described in the following.

Concentrically round the inlets and outlets 71 and 72 there are further tube connections 73, 74 and 75 which are connected to ring-shaped connection tubes 76, 77 and 78, which further connections are arranged to enable a whirling flow of the cooling medium. In FIGURE 1 the full line arrows show the circulation in normal operation whereas the dotted arrows show the circulation during the rearrangement of the fuel elements. The reactor tank 68 is also filled with ball shaped fuel elements 79. To the connection 72 is coupled a main circulation tube 72A which is fed from a main circulation pump 80. This main pump can, due to the fact that the cooling medium, as will be further described, preferably is electrically conducting, suitably be of electromechanical type, which is advantageous with respect to the rather high temperature of the cooling medium in operation. The main circulation tube 72A has suitably a blastable lid 81 at the lowest part of the system, to facilitate a quick and complete emptying of the system.

Figure 2:
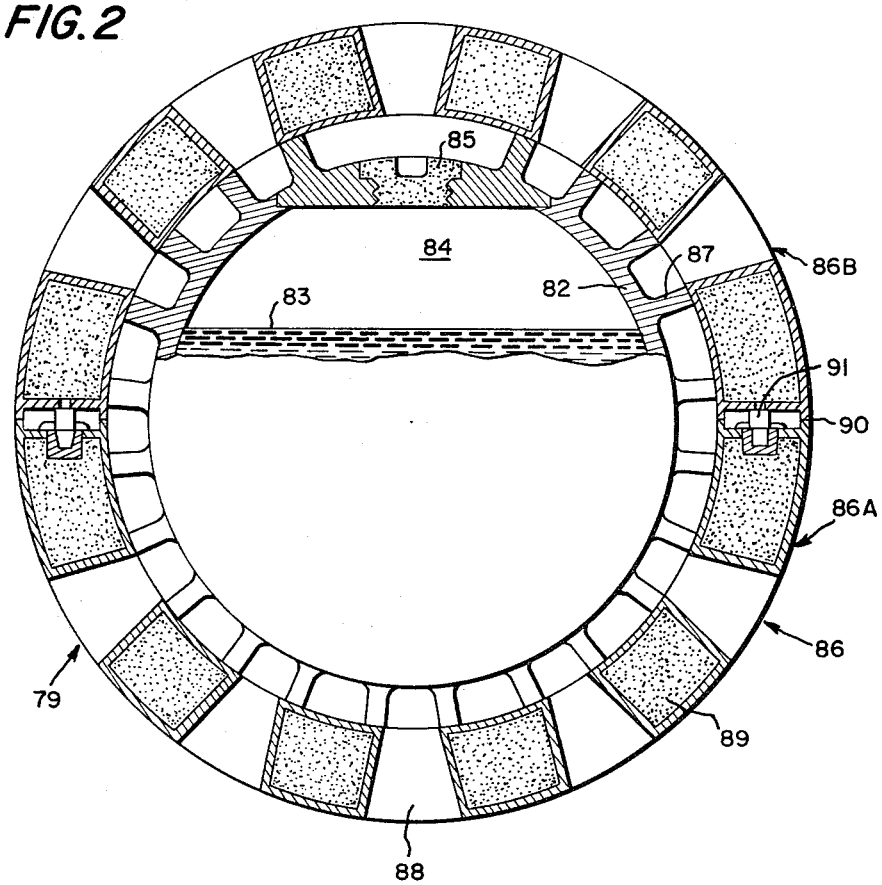
FIGURE 2 shows diagrammatically and in vertical cross-section a fuel element for use in the reactor according to FIGURE 1.

As shown in FIGURE 2 each of the fuel elements 79 consists of a preferably spherical fuel container 82. In-fuel 83, and outside it must be corrosion-proof against the cooling medium, both being further decsribed below. Furthermore, the fuel container must be mechanically stable at the actual temperatures, and have a good thermal conductivity. Preferably, the fuel container 82 should also have a low coefficient of thermal expansion to minimize the thermal strengths within the material. For the said purposes the fuel container 82 may be made, for instance, of graphite and covered inside with a coating of zirconium carbide. Outside the fuel container could have a coating of a material which is corrosion resistant against the cooling medium. As shown in FIGURE 2 the fuel container 82 is not entirely filled up with the fuel 83, but a free space 84 on top is left for collecting of fission gases and for permitting the fuel volume variations with the temperature changes. In the upper part of the fuel container 82 there is disposed a plug 85 made of a gas pervious material, so that the fission gases may leave the fuel element to the cooling medium for further transport out from the reactor.

Figure 3:
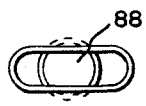
FIGURE 3 is a fragmentary plan-view of a channel opening in the fuel element in FIGURE 2.

The fuel container 82 is surrounded by an outer casing 86, which is held spaced from the outside of the fuel container 82 by means of studs 87, which suitably are made in one piece with the fuel container 82. The casing 86 has a plurality of openings 88 to permit the cooling medium to flow along the outside of the fuel container 82 in the spaces created through the studs 87. To prevent the intermediate bodies 92 further described below from blocking the openings 88, the latter are, at least radially outwardly, designed with an oblong, e.g. oval cross-section as shown in FIGURE 3.

As shown in FIGURE 2, the outer surrounding casing 86 has the shape of an entirely self-contained double-walled hollow case, the cavities 89 of which are filled with a gaseous medium or are evacuated. This gaseous medium can consist of argon or any other gas, which will not react with the wall material nor moderate the neutrons. The outer casing 86 of the fuel elements consists of two half spherical parts 86A and 86B, each of which is entirely closed, which are connected along a joint 90 at the outer circumference and kept centered to one another by means of studs 91 on the part 86B which engage corresponding holes in the other part 86A.

The center of gravity of the fuel element is under the center of lift for the fuel element 79 as a whole. This is made possible as the studs 87 are shorter at the lower part of the fuel container than at its upper part. Thus, it is ensured that the gas previous plug 85 will always be positioned on top so as to permit the fission gases to leave. The studs 87 also contribute considerably to the out transport of heat from the molten fuel to the cooling medium.

Figure 4:
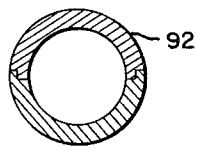
FIGURE 4 is a cross-section of a moderator ball.

In practice the fuel elements 79 have a diameter within the range 100–500 mm. and therefore there are rather large spaces between them. Although this is not shown in FIGURE 5, it is advisable to have this space filled up with neutron absorbing intermediate bodies 92, e.g. of the kind shown in FIGURE 4. These intermediate bodies 92 have considerably less volume than the fuel elements and consist mainly of a fertile material, as for instance thorium. The purpose of using these intermediate bodies 92 is to ensure that the largest possible quantity of fertile material will be obtained in the reactor core to favorably influence the operating conditions. The intermediate bodies 92 may have the shape of spherical hollow balls, so that their volume weight will closely conform to the specific gravity of the cooling medium. Further, they should preferably have an outer coating which is corrosion-proof against the cooling medium.

In the shown example the fuel 83 consists of a melt of both fissible and fertile material. The fissible material suitably consists of $U^{235}$, Pu or $U^{233}$. The fertile material suitably consists of $U^{238}$ or $Th^{232}$. The proportion between these materials is determined by the size of the reactor and the individual fuel elements.

One of the fundamental ideas of the invention is that as much fuel material as possible shall be concentrated within the reactor volume, however, without jeopardizing the withdrawal of the fission heat. It is very essential that the material in the reactor core presents as little neutron absorption capacity as possible. This is of special importance as regards the cooling medium. Besides, it is desirable that the cooling medium have a high value of specific heat. Therefore, I prefer to use molten metal as a cooling medium, preferably consisting of a mixture of natrium and lead. A suitable mixture of these two materials has proportions of about 65 volume percent of Pb and about 35 volume percent of Na. It should be mentioned that the specific gravity of said cooling medium is in the range of about 8.6. It should also be mentioned that the rather high percentage of Pb considerably raises the boiling point, so that a good margin against boiling in case of local overheating is ensured. Further, such a cooling medium has lower moderating properties than the usually used cooling medium Na or Na-k.

It is important to keep the reactivity at a strongly under-critical value, especially by the rearrangement of the fuel element. For this purpose it is suitable, at least during said fuel rearrangement, to add strongly neutron absorbing particles or bodies to the cooling medium. These bodies, which are suitably granule- or ball-shaped, could consist of boron-iron or boron-cobalt, respectively, or compositions thereof. As these bodies in themselves are not corrosion-proof against the cooling medium, they must also be coated with some corrosion-proof coating, as already indicated for the fuel elements 79 and the intermediate bodies 92.

The quantity of neutron absorbing bodies included in the cooling medium can suitably be controlled in a magnetic way by means of electromagnetic separators, FIGURES 5–8, or possibly by means of movable permanent-magnetic separators.

It would also be possible to control the quantity of the neutron absorbing bodies in the cooling medium by straining and renewed charging of bodies.

Figure 5:
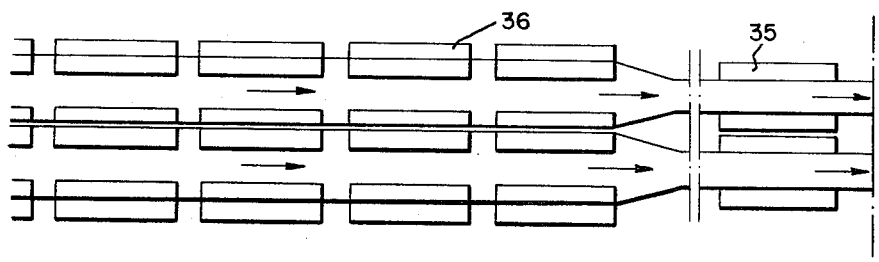
FIGURES 5 to 8 illustrate diagrammatically various arrangements of magnetic control devices.
Figure 6:
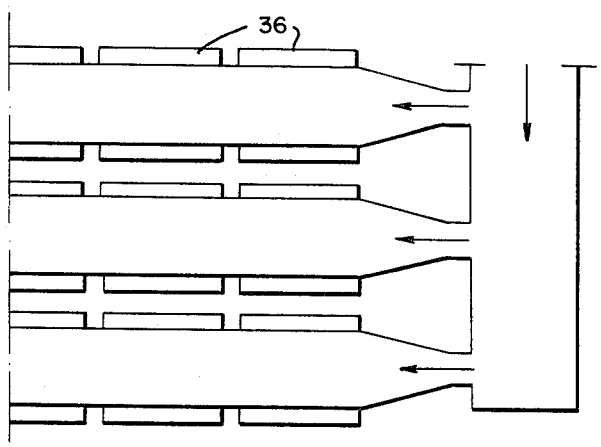
Figure 7:
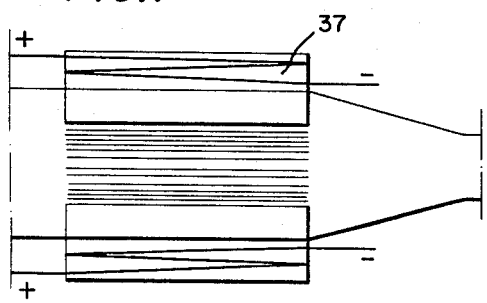
Figure 8:
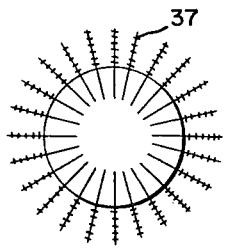

In FIGURE 5 there is shown a part of the cooling medium circulation system in which the cooling medium is circulated by means of electromagnetic pumps 35, and simultaneously there are shown electromagnetic separators 36, coupled in series. In FIGURE 6 there is shown a similar arrangement, where the electromagnetic separators 36 are placed on parallel cooling medium tubes. In FIGURES 7 and 8 the electromagnetic separators consist of fins 37, partly protruding radially into the cooling medium tubes and partly extending outside these tubes. The outer part is provided with an electric winding or coil, so that when current is supplied, this causes a strong magnetic field around the internal fin parts, whereby these, to a desirable extent will be capable of keeping respectively give free, the neutron absorbing bodies made of magnetically effectable material, i.e. boron-iron or boron-cobalt.

Figure 9:
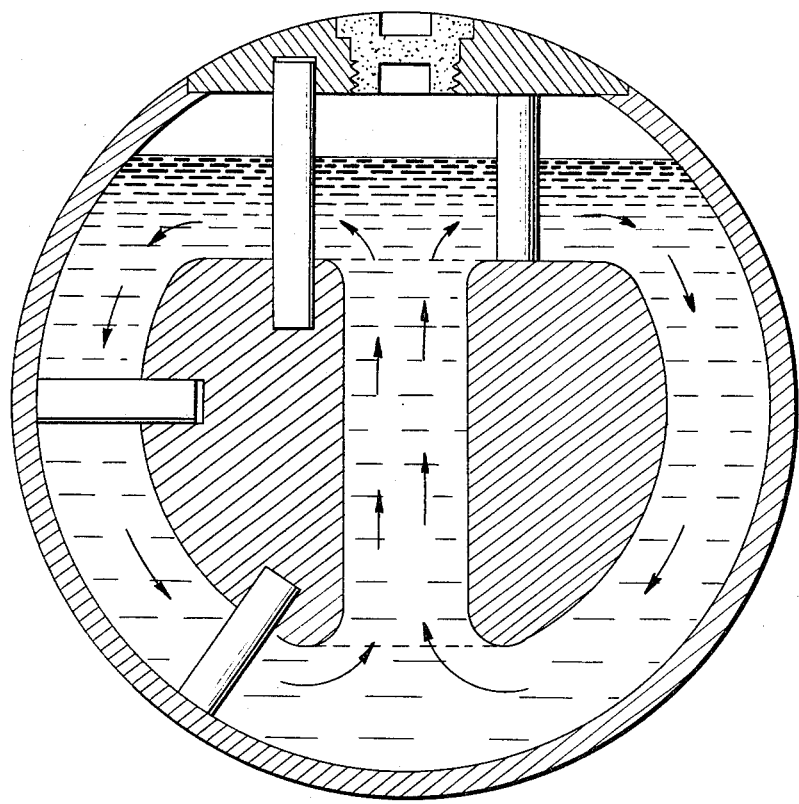
FIGURE 9 is a vertical cross-section of another type of fuel element.

The intermittent reactor type may be designed as either a thermal version or a breeder reactor version. If it is designed as a thermal reactor then the fuel elements, which are of a design comparable to that of the fuel elements as disclosed in my above said co-pending application, may be further improved by placing inside them a central flow controlling body, preferably consisting of the same material as the moderator around the fuel elements, such as shown in FIGURE 9.

I claim:
1. In a heterogeneous reactor, an at least substantially spherical reactor tank having parts wherein the neutron flux is strong and parts wherein the neutron flux is of less strength, a coolant in a molten state in said reactor tank, said coolant carrying fuel elements in the shape of spherical bodies housing fuel in at least partly molten state and having a spherical outer housing and an inner container also of spherical form, the inner container being supported within the outer housing by means of separated spacing elements to thereby maintain a spherical spacing between the inner container and the outer housing, coolant channels extending through the outer housing and communicating with said spherical spacing, the specific gravity of said fuel bodies being at least substantially equal to that of the coolant in which said elements are carried, connections for carrying said cooling medium into and from said reactor tank arranged at two diametrically positioned sections of said reactor tank, said connections being divided into at least two groups, comprising one central group positioned diametrically to each other having inlets and outlets for said cooling medium, said central group having a flow-through direction of said cooling medium always the same, except when performing fuel exchange, and a second group of connections around said central group, means for achieving a reversal of the flow-through direction through said second group of connections, so that in running state, the entire cross-section of the reactor is flowed through by said cooling medium in a parallel flow to ensure the most effective heat transport possible and said fuel elements are kept in a fixed position in said tank by a hydrodynamic pressure while in a fuel rearrangement state, by reversed flow-through direction through said second group of connections, the cooling medium is caused to move in a whirling motion in said tank to rearrange said fuel elements in a transport cycle from the central part of said tank, where the neutron flux is high, to more peripherically situated parts, where the neutron flux is lower.

2. A heterogeneous reactor as set forth in claim 1 wherein said fuel container contains both fissile material such as $U^{235}$, Pu, $U^{233}$ and fertile material such as $U^{238}$, $Th^{232}$ and said casing has the shape of an entirely self-contained double-walled hollow case having cavities which are filled with a gaseous medium and the space between said fuel elements is filled with intermediate bodies having less volume than said fuel elements comprising mainly a fertile material, such as thorium, floating in said cooling medium, said cooling medium comprising a mixture of molten metal, comprising about 65 percent by volume lead, Pb, and 35 percent by volume of natrium, Na, said cooling medium further containing neutron absorbing bodies of granule or ball shape, which similarly are floating in said cooling medium.

3. A heterogeneous reactor as claimed in claim 2 wherein said neutron absorbing bodies have an addition of a magnetic material and wherein an outer circulation system for the cooling medium is provided with magnetic separating means for controlling the amount of absorbing bodies within the cooling medium.

References Cited
UNITED STATES PATENTS

| | | | |
|---|---|---|---|
| 2,938,844 | 5/1960 | Graham et al. | 176—48 |
| 2,975,116 | 3/1961 | Daniels | 176—45 |
| 3,046,212 | 7/1962 | Anderson | 176—45 |
| 3,058,897 | 10/1962 | Slack et al. | 176—45 |

CARL D. QUARFORTH, *Primary Examiner.*

H. E. BEHREND, *Assistant Examiner.*